(12) United States Patent
Wood et al.

(10) Patent No.: US 10,907,436 B2
(45) Date of Patent: *Feb. 2, 2021

(54) EMERGENCY POWER SYSTEM FOR BLOWOUT PREVENTER OF A PETROLEUM APPARATUS

(71) Applicants: Bradford A Wood, Clearwater, FL (US); James K Pugh, Pinellas Park, FL (US); Juan A Cubero, Largo, FL (US)

(72) Inventors: Bradford A Wood, Clearwater, FL (US); James K Pugh, Pinellas Park, FL (US); Juan A Cubero, Largo, FL (US)

(73) Assignee: ENERSYS, Pinellas Park, FL (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/216,004

(22) Filed: Jul. 21, 2016

(65) Prior Publication Data

US 2016/0326826 A1    Nov. 10, 2016

Related U.S. Application Data

(62) Division of application No. 13/200,994, filed on Oct. 5, 2011, now Pat. No. 9,419,288.

(Continued)

(51) Int. Cl.
| | |
|---|---|
| *E21B 33/064* | (2006.01) |
| *E21B 33/06* | (2006.01) |
| *E21B 33/03* | (2006.01) |
| *E21B 33/02* | (2006.01) |
| *H01M 6/36* | (2006.01) |

(Continued)

(52) U.S. Cl.
CPC ............ *E21B 33/064* (2013.01); *E21B 33/02* (2013.01); *E21B 33/03* (2013.01); *E21B 33/06* (2013.01); *E21B 33/061* (2013.01); *E21B 33/062* (2013.01); *E21B 33/063* (2013.01); *H01M 6/36* (2013.01); *B60L 1/00* (2013.01); *H01M 6/38* (2013.01); *H01M 16/00* (2013.01)

(58) Field of Classification Search
CPC ...... E21B 33/064; E21B 33/06; E21B 33/062; E21B 33/02; E21B 33/03; E21B 33/061; E21B 33/063; H01M 6/36; H01M 6/38
See application file for complete search history.

(56) References Cited

U.S. PATENT DOCUMENTS

| | | | |
|---|---|---|---|
| 9,419,288 B2* | 8/2016 | Wood | E21B 33/064 |
| 2005/0253458 A1* | 11/2005 | Omae | H02J 7/1423 |
| | | | 307/10.1 |

(Continued)

*Primary Examiner* — Milton I Cano
*Assistant Examiner* — Kiran Akhtar
(74) *Attorney, Agent, or Firm* — Frijouf, Rust & Pyle P.A

(57) ABSTRACT

An improved emergency power system is disclosed for providing electrical power to a load such as a blowout preventer of a petroleum drilling apparatus. The improved emergency power system comprises a thermal battery having an anode and a cathode with a separator containing an electrolyte disposed therebetween. An internal heat layer is located in proximity to the separator containing the electrolyte. A squib is provided for activating the internal heat layer. The thermal battery remains dormant until the squib is energized to ignite the squib enabling the heat layer to render the electrolyte molten thereby activating battery to provide electrical power to the load. The squib may be energized remotely, mechanically or electrically.

7 Claims, 5 Drawing Sheets

Related U.S. Application Data

(60) Provisional application No. 61/404,629, filed on Oct. 6, 2010.

(51) Int. Cl.
    *H01M 16/00*     (2006.01)
    *B60L 1/00*     (2006.01)
    *H01M 6/38*     (2006.01)

(56) References Cited

U.S. PATENT DOCUMENTS

2008/0048140 A1*   2/2008   Whitby ................ E21B 33/062
                                                                                        251/1.3
2008/0238095 A1*   10/2008   Yater ...................... E21B 21/02
                                                                                       285/333

\* cited by examiner

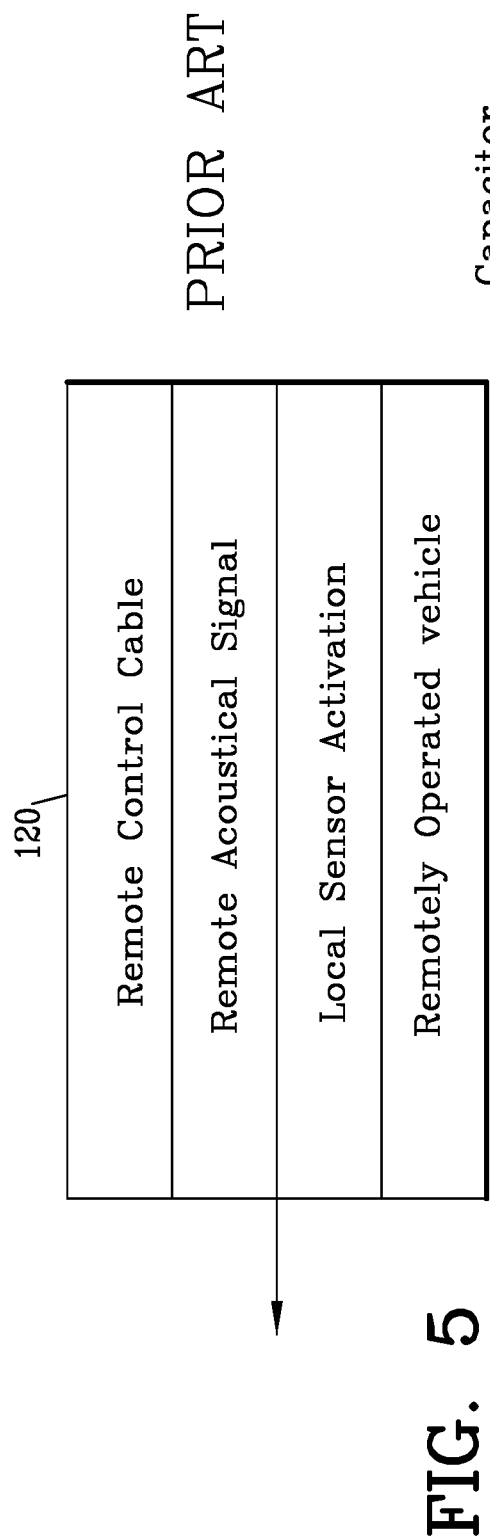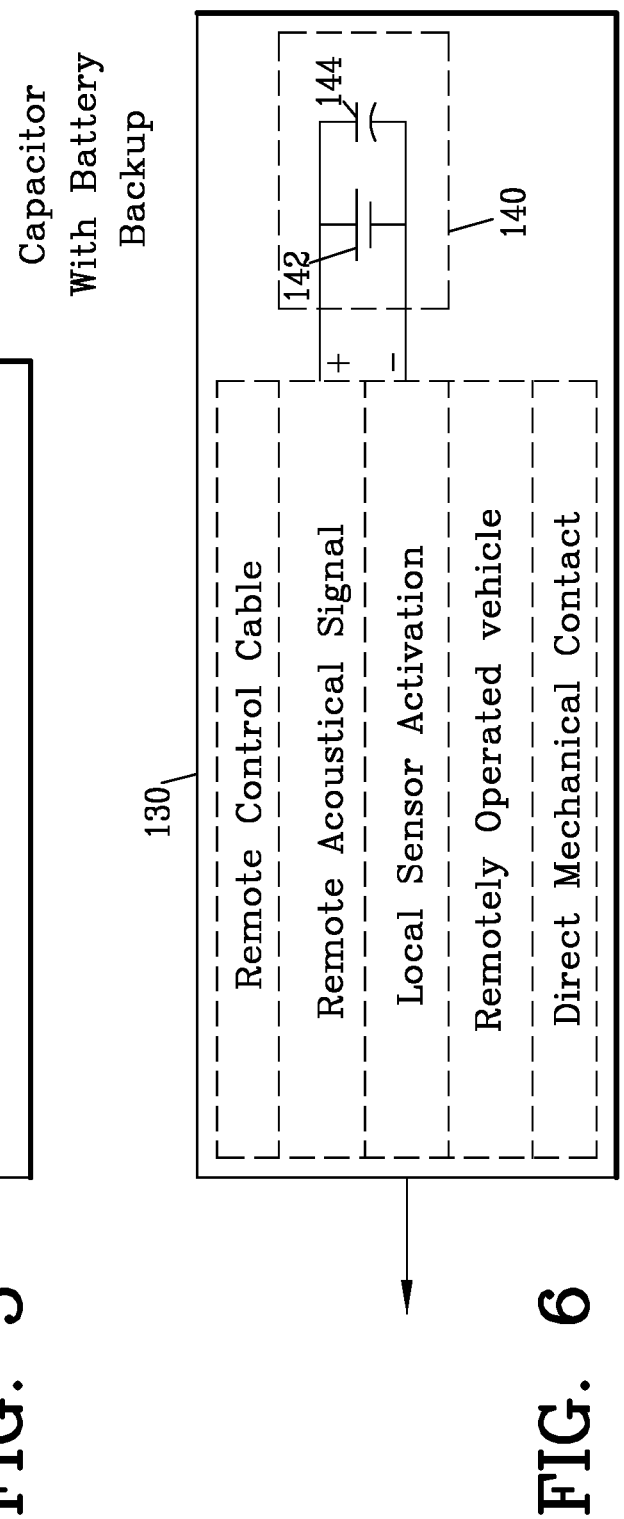

EMERGENCY POWER SYSTEM FOR BLOWOUT PREVENTER OF A PETROLEUM APPARATUS

CROSS-REFERENCE TO RELATED APPLICATIONS

This application is a Division of U.S. application Ser. No. 13/200,994 filed Oct. 5, 2011. U.S. application Ser. No. 13/200,994 filed Oct. 5, 2011, now U.S. Pat. No. 9,419,288, claims benefit of U.S. provisional application Ser. No. 61/404,629 filed Oct. 6, 2010, All subject matter set forth in U.S. application Ser. No. 13/200,994 filed Oct. 5, 2011 and U.S. provisional application No. 61/404,629 filed Oct. 6, 2010 is hereby incorporated by reference into the present application as if fully set forth herein.

BACKGROUND OF THE INVENTION

1. Field of the Invention

This invention relates to thermal batteries and more specifically to a thermal battery for providing standby or emergency power for a load such as a conventional blowout preventer of a petroleum drilling operation 2. Description of the Related Art The drilling for oil has always been a hazardous activity for the personnel at the well site, the drilling equipment, and the environment. The uncontrolled release of crude oil and/or natural gas after failure of pressure control systems is known as a blowout. Prior to the invention of pressure control equipment in the early $20^{th}$ century, an uncontrolled release of crude oil was known as a gusher.

In 1924, the first successful blowout preventer (BOP) was invented. As technology improved, blowouts became relatively rare. Modern blowout preventers comprise a blowout preventer stack, including several blowout preventers of varying type and function and auxiliary components. Blowout preventers are used on surface as wells subsea well including deepwater wells.

A typical sub-sea blowout preventer would include a stack of blowout preventers and associated hydraulic and electrical systems and components. Control of the blowout preventer is typically accomplished in one of four ways. A first way of controlling a blowout preventer is by an electrical control signal from the surface via a control cable. A second way of controlling a blowout preventer is by an acoustical control signal sent from the surface based acoustic signal generator through the water to the blowout preventer. A third way of controlling a blowout preventer is by a remotely operated vehicle (ROV) mechanically operating a control valve to provide hydraulic pressure to the blowout preventer. A forth way of controlling a blowout preventer is by a "dead-man" switch for fail-safe activation in the event of loss of control and power as well as loss of hydraulic lines.

Generally, two control pods are provided for redundant operation. The primary control of the pods is electrical, while acoustical controls, ROV controls and dead-man controls are secondary. An emergency disconnect system (EDS) is designed to disconnect the rig from the well in the event of an emergency. The EDS also triggers the dead-man switch which closes the blowout preventer.

Although blowouts are now rather rare, both the short and long term effects of a sub-sea blowout can be catastrophic. The Deepwater Horizon blowout graphically illustrates the need to further refine blowout preventers and the associated components to achieve total reliability. In the case of the Deepwater Horizon, a document discussed in the Congressional hearings suggested that a battery in the blowout preventers control pod had failed. Several other scenarios have also been proposed to explain the failure of the blowout preventers.

There have been many in the prior art who have attempted to solve these problems with varying degrees of success. None, however, completely satisfies the requirements for a complete solution to the aforesaid problems. The following U.S. Patents are attempts of the prior art to solve this problem.

U.S. Pat. No. 3,695,349 to Murman, et al discloses the constriction of a packer or other tool about a pipe string being run in a well altered in such manner while a pipe joint is passing through the packer as to facilitate rapid running of the string in a well and to reduce wear of the packer.

U.S. Pat. No. 4,215,746 to Hallden, et al discloses an electro-pneumatic or electro-hydraulic safety system for shutting in a well or the like in the event of unusual pressure conditions in the production line of the well. The safety system includes a pressure transducer which senses the flow line pressure and provides a corresponding electrical signal to a digital controller. When the signal applied to the controller is outside of a preset range defined between low and high settings of the controller, a control circuit de-energizes a solenoid valve which bleeds fluid from a fluid actuator in order to close a surface safety valve. Once the safety valve has closed, the controller is latched out of service and must be manually reset before the safety valve can be opened. For protection of a subsurface safety valve, the safety system provides a time delay between opening of the subsurface valve and opening of the surface valve and also between closing of the surface valve and closing of the subsurface valve.

U.S. Pat. No. 4,317,557 to Orr discloses a blowout preventer control system for use in well operations including a blowout preventer having at least one opening chamber and at least one closing chamber, and an operating power fluid source connected to the blowout preventer opening and closing chambers by an opening conduit and a closing conduit, respectively. A valve controlled conduit is connected to the opening conduit to ensure drainage of power fluid from the opening chamber of the blowout preventer. A three-way shuttle valve is connected into the closing conduit close to the blowout preventer. The shuttle valve is provided with an inlet which is connected to the closing conduit and another inlet which is connected by a conduit to an independent blowout preventer operating power fluid source. An outlet of the shuttle valve is connected to the closing chamber of the blowout preventer.

U.S. Pat. No. 4,337,653 to Chauffe discloses a control and recorder system for a blowout preventer for providing a record of operation and status of the various components of the blowout control system at periodic times and after a function operation. The system monitors various functions such as whether the accumulator pump is running, the open and close status of the various rams, bypass, annular, flow line, kill line and choke line as well as various pressures, such as in the annular, the accumulator and the manifold, flow measurements of various fluids in the system and provides alarms for various parameter values. Control and status information may be transmitted through fiber optic cables between various control stations at the rig floor, accumulators and remote locations for avoiding interference by electrical noises or radio frequencies and providing a safety link through hazardous gas areas.

U.S. Pat. No. 4,349,041 to Bates discloses a control valve system and method for blowout preventers having an actuating piston for actuating the closing of the blowout preventer whereby the piston has an opening side and a closing side. The control valve system and method include a means for selectively directing fluid from the opening side of the actuating piston to the closing side of the actuating piston in order to reduce the fluid requirements for closing the blowout preventer and the reduction in stalled horsepower requirements thereby.

U.S. Pat. No. 4,384,612 to Bradford, et al discloses a control apparatus for preventing inadvertent operation of the draw works of a drilling rig upon closure of an associated blowout preventer, the draw works being at least partially operated by air from an air source connected thereto by an air conduit. The control apparatus may comprise control components for connection to the air conduit and movable from a first mode, in which air is permitted to communicate with the draw works through the air conduit, and a second mode, in which air is prevented from communicating with the draw works. Also included are monitor components for connection to the blowout preventer and the control components for sensing whether the blowout preventer is in opened or closed positions and initiating movement of the control components to the second mode upon movement of the blowout preventer to the closed position.

U.S. Pat. No. 4,422,503 to Goans discloses an improved control line blow out preventer valve, having a fluid pressure chamber interposed in a control line extending from a surface control panel to a down-hole safety valve in a subterranean well. Axially spaced inlet and outlet openings are provided in the pressure chamber and a piston is reciprocally mounted between the inlet and outlet openings. A sealing plug carried by the piston cooperates with a seal surrounding the inlet opening. A bypass passage through the piston mounts a check valve which permits free fluid flow in the direction from the control panel to the subsurface safety valve but only a restricted fluid flow in the opposite direction. A check valve is mounted in the outlet passage to prevent fluid flow from the subsurface safety valve to the control panel. A fusible link normally maintains this check valve off its seat so that it does not close until the occurrence of an elevated temperature caused by fire. At the inlet port a bleed valve which is thermally activated is incorporated in order to bleed off the safety valve, or other apparatus, pressure in the event of a fire.

U.S. Pat. No. 5,070,904 to McMahon, Jr., et al discloses a blowout preventer sub-sea control system utilizing hydraulic control of non-critical functions and electro-hydraulic control of selected critical functions, such as the closing mode of one or more shear ram blowout preventers, one or more pipe ram blowout preventers and one or more annular type blowout preventers. In an alternative embodiment, the use of a conductive fluid in a hydraulic hose enables electric signals and hydraulic signals to be transmitted in the same hose.

U.S. Pat. No. 5,398,761 to Reynolds, et al discloses a modular sub-sea control pod assembly having a retrievable pod assembly and a receptacle assembly. The retrievable pod assembly has a stab block and at least one function port having an opening in the stab block. The retrievable pod assembly includes a pod gate which is adapted to move between a first position in which the pod gate covers the function port opening and a second position in which the pod gate does not cover the function port opening. The receptacle assembly includes a receptacle base module adapted to receive the stab block and a receptacle function port adapted to be connected to a blowout preventer hydraulic operator. The receptacle assembly includes a receptacle gate which is adapted to move between a first position in which the receptacle gate covers the receptacle function port opening and a second position in which the receptacle gate does not cover the receptacle function port opening. Seal assemblies are provided to operate with the pod gates and the receptacle gates to seal the function and receptacle function ports against the intrusion of saltwater.

U.S. Pat. No. 6,367,566 to Hill discloses a system and method of the present invention permitting control of down hole fluid pressures during under balanced drilling, tripping of the drill string, and well completion to substantially avoid "killing" of the well and thereby damaging the producing formations in the well bore. The system and method utilizes separate and interconnected fluid pathways for introducing a downwardly flowing hydrodynamic control fluid through one fluid pathway and for removing through the other fluid pathway a commingled fluid formed by mixing of the hydrodynamic control fluid and the well bore fluids flowing upwardly in the well bore.

U.S. Pat. No. 7,062,960 to Couren, et al discloses that the consequences of any failure of a blow out preventer assembly to operate correctly in an emergency can be far reaching. Thus, there is provided an apparatus for registering parameters in the bore of a member which is, in use, connected to a pressurized housing, the apparatus comprising: an electro-control package for attachment, in use, to the member; a test assembly placed, in use, in the member; the electro-control package and the test assembly having means for sending signals to and receiving signals from one another.

U.S. Pat. No. 7,222,674 to Reynolds discloses a distributed function control module adapted for use in a modular blowout preventer stack for use sub-sea comprising a housing, adapted to be manipulated by a remotely operated vehicle (ROV) with a stab portion adapted to be received into a blowout preventer stack control module receiver. Control electronics, adapted to control a predetermined function with respect to the blowout preventer stack are disposed within the housing and connected to one or more controllable devices by a wet mateable connector interface.

Others in the prior art have provided rechargeable batteries for emergency power applications for a variety of electronic equipment. Unfortunately, typical rechargeable batteries do not have an extended shelf life.

Thermal batteries have been used in the past for power sources in many military applications. Thermal batteries are mission critical power sources used extensively for strategic and tactical Department of Defense applications. As such, the reliability of thermal batteries is the highest available for portable power generation sources. Thermal batteries have no self-discharge reactions, and can be activated at any temperature extreme needed (typical test conditions are −54 to +60° C. but can be as high as +80° C.). Thermal batteries also offer extremely high current load capabilities and can be custom fabricated to support any voltage and current requirement. The shelf-life of thermal batteries is over 30 years. Typically a thermal battery outlives the system utilizing the thermal battery.

Therefore, it is an object of the present invention to provide an improved emergency power system incorporating a thermal battery for providing primary or backup emergency power.

Another object of this invention is to provide an improved emergency power system incorporating a single use thermal battery.

Another object of this invention is to provide an improved emergency power system for use in a blowout preventer.

Another object of this invention is to provide an improved emergency power system for extending the useful life of blowout preventer control systems.

Another object of this invention is to provide an improved emergency power system incorporating a thermal battery that may be activated by a control cable.

Another object of this invention is to provide an improved emergency power system incorporating a thermal battery that is activated by an acoustical control signal.

Another object of this invention is to provide an improved emergency power system incorporating a super-capacitor or small rechargeable battery for receiving an acoustical control signal to activate the improved emergency power system.

Another object of this invention is to provide an improved emergency power system incorporating a thermal battery that may be activated by a manipulator arm on a remotely operated vehicle (ROV).

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved emergency power system for providing electrical power to a load, comprising a thermal battery having an anode and a cathode with a separator containing an electrolyte disposed between the anode and the cathode. An internal heat layer is located in proximity to the separator containing the electrolyte. A squib has a first and a second squib terminal located proximate the internal heat layer. An anode and a cathode connector connect the anode and cathode to the load. A remotely operated actuator energizes the squib for igniting the squib and the heat layer to activate the electrolyte to provide electrical power to the load.

The improved emergency power system is suitable for use as a primary or a secondary power source for a blowout preventer of a petroleum apparatus. In one specific example of the invention, the remotely operated actuator is operated from a remote location. In another specific example of the invention, the remotely operated actuator comprises an electrical connection to a remote electrical source. In a further example, the remotely operated actuator comprises an acoustical connection to a remote acoustical source. In still a further example, the remotely operated actuator comprises direct mechanical contact with a remote operated vehicle.

In another embodiment, the invention is incorporated into an improved emergency power system for providing electrical power to a load comprising a thermal battery having a primer for activating the thermal battery. An actuator comprises a spring-loaded firing pin aligned with the primer. A blocking member maintains the spring-loaded firing pin in a cocked position. The spring-loaded firing pin impacts the primer upon removal of the blocking member to ignite the primer and the heat layer to activate the electrolyte to provide electrical power to the load.

In another embodiment, the invention is incorporated into an improved emergency power system for providing electrical power to a load comprising a thermal battery having a squib. A sensor provides a sensor output upon sensing a requirement of electrical power to the load. A remotely operated actuator is connected to the sensor for energizing the squib for igniting the squib and the heat layer to activate the electrolyte to provide electrical power to the load. In one example, the sensor provides a sensor output upon sensing different and undesirable pressure in a petroleum apparatus.

In still another embodiment, the invention is incorporated into an improved emergency power system for providing secondary electrical power to a primary battery for a blowout preventer of a petroleum apparatus. The primary battery is connected to an electric motor for driving hydraulic apparatus to operate the blowout preventer. An isolator is interposed between the primary battery electrical power and the electric motor of the blowout preventer. A thermal battery is connected to the isolator. An actuator actuates the thermal battery to provide electrical power to the isolator upon failure of the primary battery. The isolator prevents electrical current from flowing from the thermal battery into the primary battery.

In an alternate example, a sensor senses an undesired pressure in the petroleum apparatus and senses the failure of the primary battery. The sensor is connected to the actuator for actuating the thermal battery upon sensing an undesired pressure in the petroleum apparatus and the failure of the primary battery.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 5 is a magnified view of the conventional actuator of FIG. 3;

FIG. 6 is a magnified view of the thermal battery actuator of FIG. 4;

Similar reference characters refer to similar parts throughout the several Figures of the drawings.

DETAILED DISCUSSION

Figure 1:
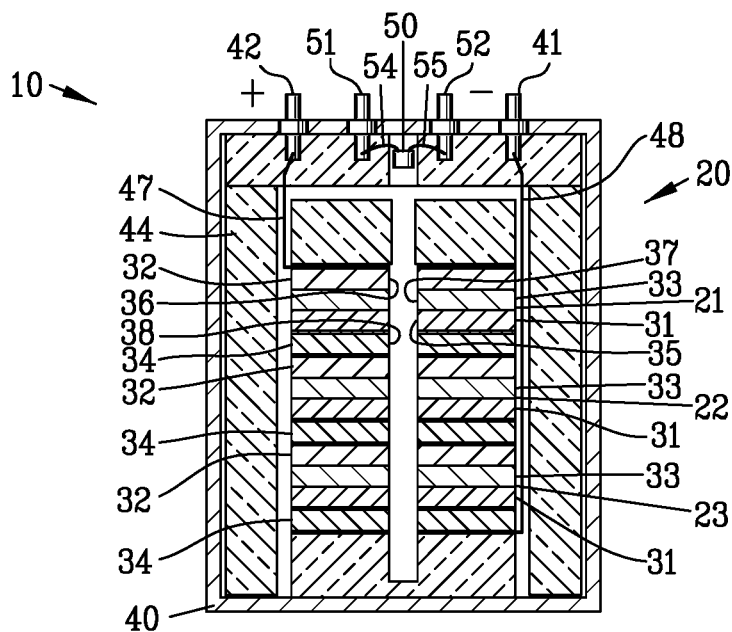
FIG. 1 is a side section view of thermal battery incorporating the present invention.

FIG. 1 is a side section view of thermal battery 10 suitable for use with the present invention. The thermal battery 10 comprises a plurality of cells 20 shown as cell 21-23 arranged in a stacked relationship. Each of the cells 21-23 comprises a plurality of battery components shown as an anode 31, a cathode 32, a separator 33 and a heat source 34. Each of the anode 31, cathode 32, separator 33 and heat source 34 is provide with holes 35-38, respectively.

The plurality of cells 20 are enclosed in a battery case 40. The battery case supports battery terminals 41 and 42. Insulation 44 is interposed between the battery case 40 and the plurality of cells 20. The plurality of cells 20 are connected to the battery terminals 41 and 42 by conductors 47 and 48.

The thermal battery 10 is provided with a squib 50 having a first and a second electrical terminal 51 and 52. The first and second electrical terminals 51 and 52 are connected to squib leads 54 and 55 located adjacent to the battery terminals 41 and 42.

Upon the application of electric voltage to the squib terminals 51 and 52, the squib 50 ignites each of the heat layers 34 within the cells 21-23. The ignition of the heat layers 34 within the cells 21-23 activates the electrolyte within the separators 33 to actuate each of the cells 20 within the battery case. Voltage produced by each of the plurality of cells 20 appears at the battery terminals 41 and 42.

Figure 2:
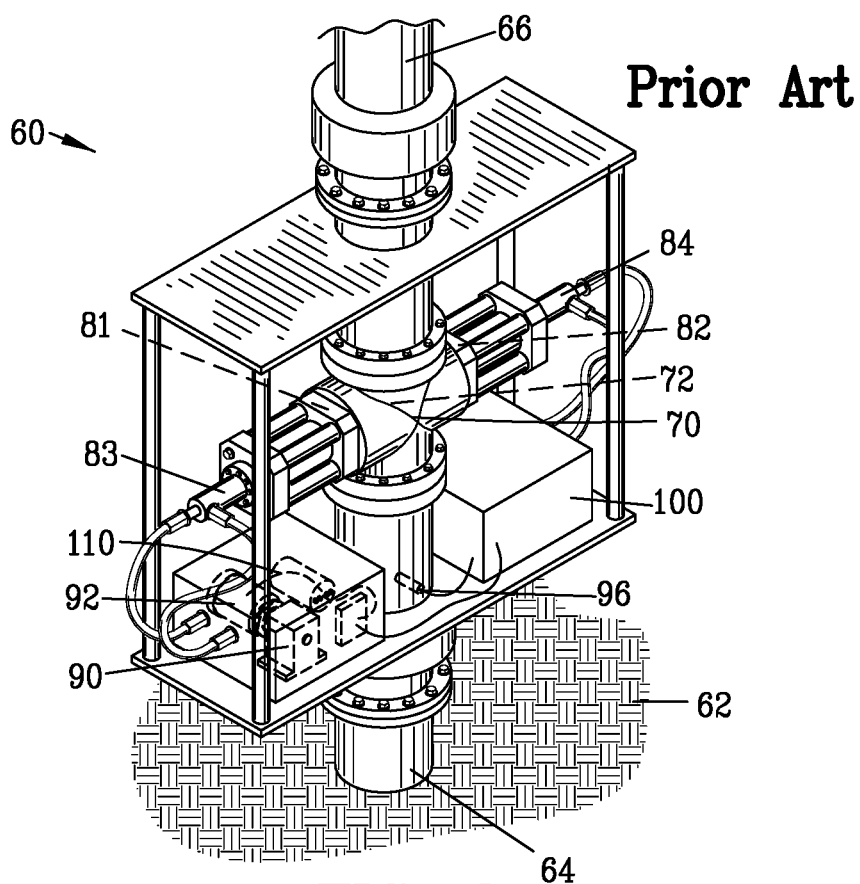
FIG. 2 is an isometric view of a blowout preventer of the prior art.

FIG. 2 is an isometric view of a blowout preventer 60 incorporating the improved thermal battery 10 of FIG. 1. In this example, the blowout preventer 60 is shown located adjacent to the seafloor 62 and interconnected between a wellhead 64 and a riser 66. The connection of the blowout preventer 60 to the wellhead 64 and the riser 66 should be well known to those skilled in the art.

The blowout preventer 60 comprises a housing 70 having a tubular bore protector 72 located within the housing 70. The tubular bore protector 72 interconnects the wellhead 64 and the riser 66. The bore protector 72 is formed from a malleable material capable of deformation for terminating communication between the wellhead 64 and the riser 66 as should be well known to those skilled in the art.

A first and a second shearing ram 81 and 82 are positioned transverse to the bore protector 72. The first and second shearing rams 81 and 82 are operated by a first and a second hydraulic cylinder 83 and 84, respectively.

An electric motor 90 operates a hydraulic pump 92 to provide hydraulic fluid pressure to the hydraulic cylinders 83 and 84. A sensor 96 is located in the wellhead 64 for providing an output upon sensing a potential blowout from the wellhead 64. Preferably, the sensor 96 is a pressure sensor.

A control 100 is provided for controlling the operation of the blowout preventer 60. The control 100 is interconnected between the electric motor 90 and a conventional battery 110. In the event the sensor 96 senses an increase in pressure indicative of an imminent blowout from the wellhead 64, the sensor 96 provides an output to the control 100. The control 100 directs electrical power from the conventional battery 110 to the electric motor 90 to rotate hydraulic pump 92 to provide hydraulic pressure to the first and second shearing rams 81 and 82. The first and second shearing rams 81 and 82 deform and seal the tubular bore protector 72 to prevent a blowout from the wellhead 64.

Figure 3:
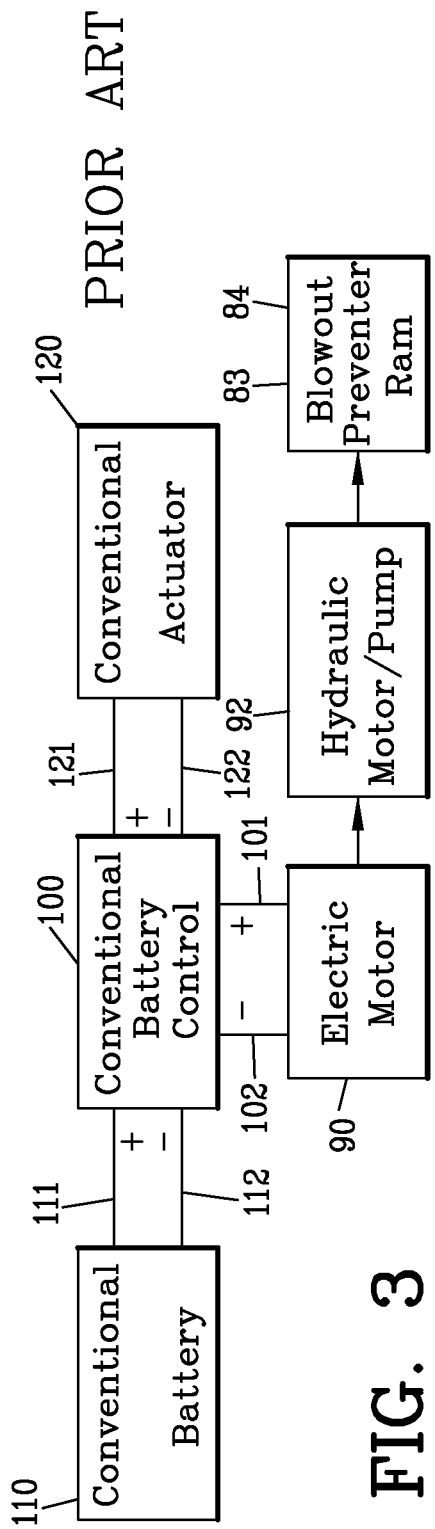
FIG. 3 is a block diagram of the prior art electrical components of the blowout preventer of FIG. 2.

FIG. 3 is a block diagram of the prior art electrical components of the blowout preventer of FIG. 2. The conventional battery control 100 is connected to the electric motor 90 by conductors 101 and 102. The conventional battery 110 includes battery terminals 111 and 112 for providing electrical power to the conventional battery control 100. A conventional actuator 120 actuates the conventional battery control 100 to direct electric power from the conventional battery 110 to the electric motor 90. The conventional actuator 120 will be described in greater detail with reference to FIG. 5.

It should be readily appreciated by those skilled in the art that a failure of the conventional battery 110 renders inoperative the electrical operation of the blowout preventer 60. In such a case, the only solution is to provide external electric power to the electric motor 90 to provide external hydraulic power to the hydraulic motor 92 for operating the first and second shearing rams 81 and 82 to deform and seal the bore protector 72 to prevent a blowout from the wellhead 64.

Figure 4:
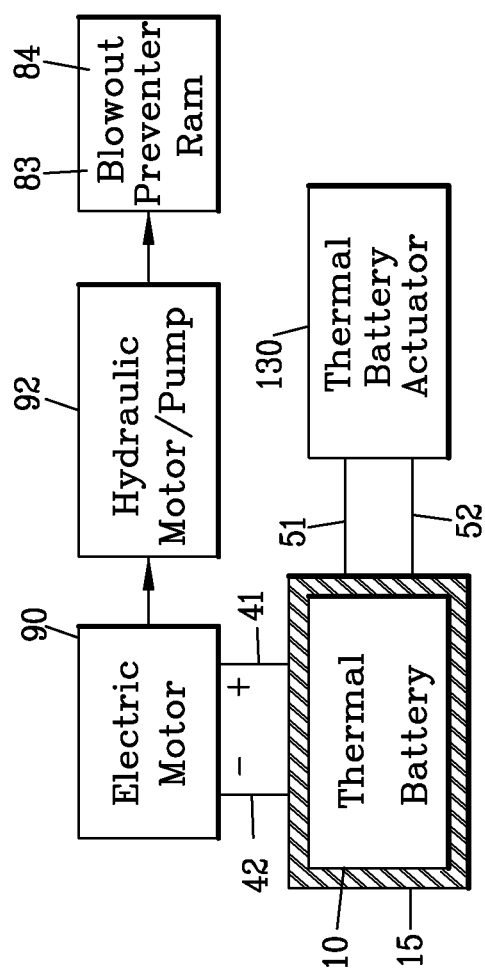
FIG. 4 is a block diagram similar to FIG. 3 incorporating the improved thermal battery of the present invention.

FIG. 4 is a block diagram similar to FIG. 3 illustrating the present invention incorporating the improved thermal battery 10 shown in FIG. 1. In this embodiment, the thermal battery 10 is incorporated as the primary power source for the blowout preventer 60. In contrast to FIG. 3, the terminals 41 and 42 of the thermal battery 10 are connected directly to the motor 90. A thermal battery actuator 130 is connected to the first and second electrical terminals 51 and 52 of the squib 50 shown in FIG. 1. The thermal battery actuator 130 will be described in greater detail with reference to FIG. 6.

Insulation 15 encases the thermal battery 10 for maintaining a proper operational temperature of the thermal battery 10 in the event the thermal battery 10 is located in a cold environment such as a freezing surface environment or a deep-sea well.

In contrast to the conventional battery 110 of FIG. 3, the thermal battery 10 can remain dormant for decades without any loss of electrical power. The separators 33 containing the electrolyte are inert prior to activation of the thermal battery 10. When the thermal battery actuator 130 energizes the squib 50 shown in FIG. 1, the squib ignites the heat layer layers 34 to activate the electrolyte to provide electrical power to the electric motor 90 to provide external hydraulic power to the hydraulic motor 92 for operating the first and second shearing rams 81 and 82 to deform and seal the bore protector 72 to prevent a blowout from the wellhead 64. The shelf life and reliability of the thermal battery 10 provide superior performance over the conventional battery 110 of the prior art.

FIG. 5 is a magnified view of the conventional actuator 120 of FIG. 3. The conventional actuator 120 includes the various devices for actuating a blowout preventer 60. The first device for actuating a blowout preventer 60 includes a remote control cable extending from a signal generator (not shown) located remote from the blowout preventer 60. The second device for actuating a blowout preventer 60 includes a remote acoustical signal generated from an acoustical signal generator (not shown) located remote from the blowout preventer 60 and a local acoustical receiver (not shown).

The third device for actuating a blowout preventer 60 includes a local sensor such as sensor 96 generating a signal from the wellhead 64. The fourth device for actuating a blowout preventer 60 is through a remotely operated vehicle (not shown) located adjacent to the blowout preventer 60.

All of the various devices for actuating the blowout preventer 60 shown in the conventional actuator 130 are dependent upon electrical power from the conventional battery 110. Failure of the conventional battery 110 results in failure of the conventional actuator 130.

FIG. 6 is a magnified view of the thermal battery actuator 130 of FIG. 4. The thermal battery actuator 130 includes the various devices for actuating a blowout preventer 60. The first device for actuating a blowout preventer 60 includes a remote control cable extending from a signal generator (not shown) located remote from the blowout preventer 60. The second device for actuating a blowout preventer 60 includes a remote acoustical signal generated from an acoustical signal generator (not shown) located remote from the blowout preventer 60 and a local acoustical receiver (not shown).

The third device for actuating a blowout preventer 60 includes a local sensor such as sensor 96 generating a signal from the wellhead 64. The fourth device for actuating a blowout preventer 60 is through a remotely operated vehicle (not shown) located adjacent to the blowout preventer 60.

The remote acoustical signal (second device) and the local sensor (third device) are dependent upon an internal battery 140 for powering the thermal battery actuator 130. In contrast to the conventional actuator 120, the internal battery 140 powers only the equipment required to energize the squib 50 to activate the thermal battery 10. The internal battery 140 is not required to power the electric motor 90 as the conventional battery 110 in FIGS. 3 and 5.

In this example, the internal battery 140 is shown as a low power battery 142 and a super capacitor 144 connected in a parallel arrangement. The internal battery 140 is sufficient to power the local acoustical receiver (not shown) and the local sensor 96 for energizing the squib 50. Once the squib 50 is energized, the thermal battery 10 powers the electric motor 90.

The thermal battery actuator 130 also includes a mechanical device such as a direct mechanical contact for activating the thermal battery 10. An example of the mechanical device will be fully explained with reference to FIG. 9.

Figure 7:
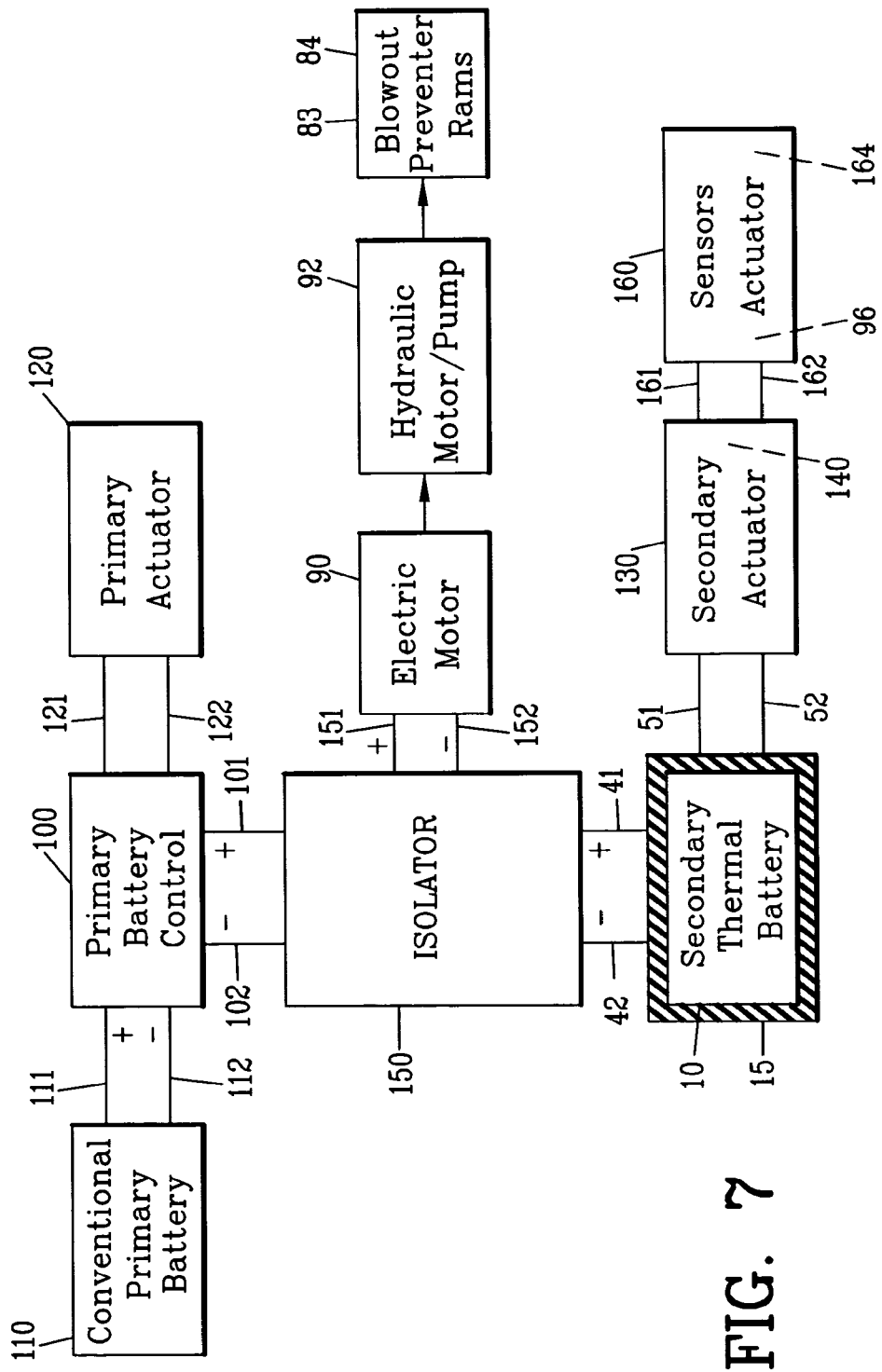
FIG. 7 is a block diagram of the thermal battery of the present invention connected as a secondary power source.

FIG. 7 is a block diagram of the thermal battery 10 of the present invention connected as a secondary power source. The conventional battery 110 provides primary electrical power through a positive and a negative terminal 111 and 112 to the conventional battery control 100. The conventional battery control 100 applies the electrical power from the conventional battery 110 through connectors 101 and 102 upon a signal from a primary actuator 120. The electrical power from the connectors 101 and 102 of the conventional battery 110 is applied to an isolator 150.

The thermal battery 10 is used as a secondary electrical power source for the blowout preventer 60. The terminals 41 and 42 of the thermal battery 10 are connected to the isolator 150. The isolator 150 prevents electrical current from flowing from the thermal battery 10 into the primary battery 110 as will be described in greater detail with reference to FIG. 8.

A sensor 160 is connected to the secondary actuator 130 by connectors 161 and 162. The sensor 160 includes the pressure sensor 96 for sensing an undesired pressure in the petroleum apparatus. In addition, the sensor 160 includes a primary battery sensor 164 for sensing the failure of the primary conventional battery 110.

The thermal battery 10 remains dormant during the normal operation of the primary battery 110. The sensor 160 provides an output to the secondary actuator 130 for energizing the squib 50 to activate the thermal battery 10 upon an imminent blowout from the wellhead 64 such as sensor 96 sensing an undesired pressure in the petroleum apparatus.

Figure 8:
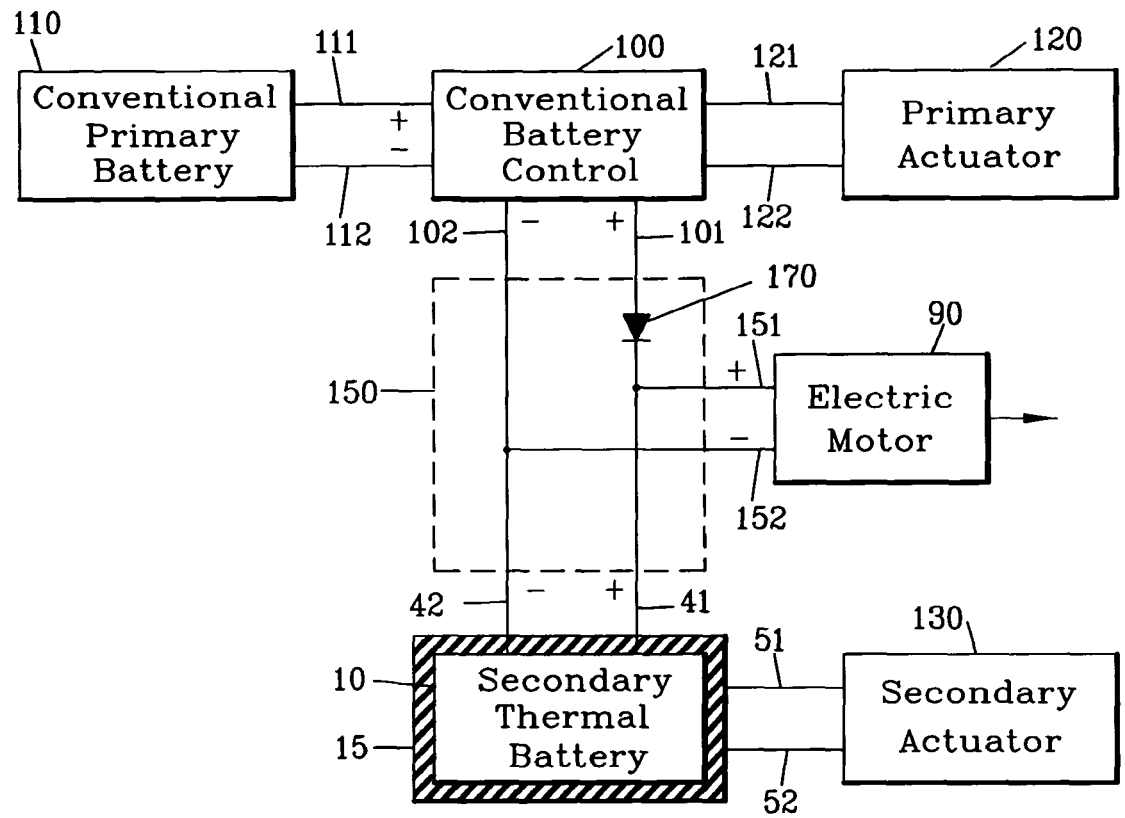
FIG. 8 is a magnified view of the isolator of FIG. 7.

FIG. 8 is a magnified view of the isolator 150 of FIG. 7. The isolator 150 in the simplest form comprises a single diode 170 interposed in the connection between the positive terminal 111 of the conventional battery 110 and the positive terminal 41 of the thermal battery 10 through the conventional battery control 100. The diode 170 prevents loading of the thermal battery 10 upon a failure of the conventional battery 110, the conventional battery control 100 and the primary actuator 120. In contrast to many conventional isolators of the prior art, the isolator 150 does not require a diode to prevent loading of the conventional battery 110 by the thermal battery 10 since the thermal battery 10 presents a high impedance prior to activation.

Figure 9:
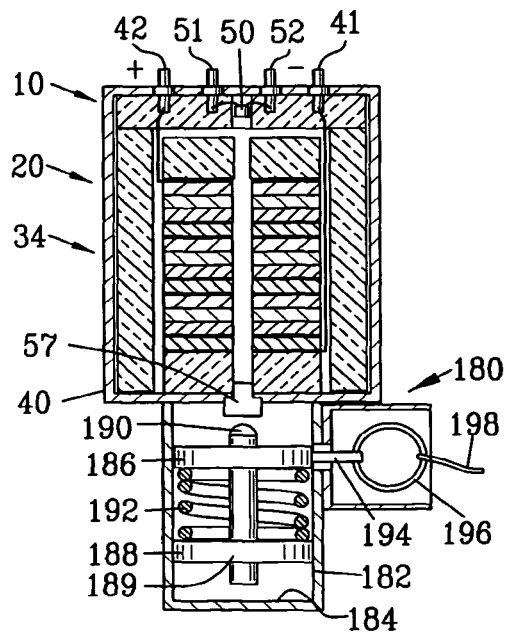
FIG. 9 is a side view of an example of a mechanical device for actuating the thermal battery shown in a cocked position.

FIG. 9 is a side view of an example of a mechanical device 180 for actuating the thermal battery 10. In one embodiment, the thermal battery 10 is provided with a primer 57 for activating the heat source 34 within the thermal battery 10. The primer 57 provides an ignition to the heat layer 34 upon a physical impact with the primer 57. The primer 57 may be similar to a primer used any center fire cartridge.

One example of the mechanical device 180 comprises a cylinder 182 defining a bore 184 with a firing pin disk 186 slidably mounted within the bore 184. A fixed disk 188 is secured within the bore 184 defining an aperture 189. A firing pin 190 is affixed to the firing pin disk 186 for movement within the bore 184. A compression spring 192 urges the firing pin 190 toward the primer 57. A blocking member 194 having a pull ring 196 maintains the firing pin 182 in a cocked position to form a spring-loaded firing pin as shown in FIG. 9. The pull ring 196 may be provided with a lanyard 198 for facilitating removal of the pull ring 196.

Figure 10:
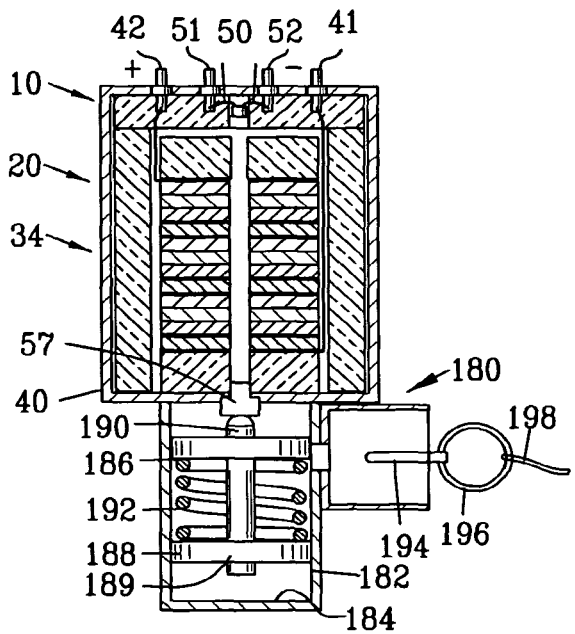
FIG. 10 is a view similar to FIG. 9 with the mechanical device shown in a firing position.

FIG. 10 is a view similar to FIG. 9 with the mechanical device 180 shown in a firing position. Removal of the blocking member 194 by the pull ring 196 enables the compression spring 192 to drive the firing pin 190 into contact with the primer 57 to actuate the thermal battery 10. The pull ring 196 may be removed by a remote operated vehicle (ROV) controlled from a remote location.

In the alternative, a pressure sensor in the form and a blowout plug (not shown) located at the position of sensor 96. The blowout plug (not shown) is affixed to the pull ring 196 by the lanyard 198. In the event of excessive pressure within the wellhead 64, the blowout plug (not shown) will be expelled from the wellhead 64. The force of the blowout plug (not shown) being expelled from the wellhead 64 removes the pull ring 196 through the attached lanyard 198. This arrangement provides a total mechanical failsafe activation of the blowout preventer 60 in the event of excessive pressure within the wellhead 64.

The thermal battery 10 of the present invention may be used as a primary battery or a secondary emergency backup battery. The thermal battery 10 is capable of providing a large amount of power for a relatively short duration. Benefits of a thermal battery include an approximate thirty (30) year shelf life with no maintenance. The thermal battery 10 activates within deciseconds (tenths of a second) and has been tested to activate between minus forty degrees centigrade to plus seventy degrees centigrade ($-40°$ C. to $+70°$ C.) with little to no adverse effects. Thermal batteries have been utilized in strategic and tactical weapon systems and have a proven track record of "no fail" mission assurance for many years.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In a blowout preventer having a tubular bore protector interconnected between a wellhead and a riser in a petroleum well, the blowout preventer having a shearing ram powered by a hydraulic system including a hydraulic pump driven by an electric motor connected to a primary battery, and a control interconnected between the electric motor and the primary battery for actuating the electric motor to move the shearing ram to deform and seal the tubular bore protector to prevent a blowout from the wellhead, the improvement comprising:
   a thermal battery having:
      an anode and a cathode with a separator containing an electrolyte disposed between the anode and the cathode;
      an internal heat layer located in proximity to said separator containing said electrolyte;
      an electrically operated primer for activating said thermal battery;
   an anode and a cathode connector directly connecting said anode and cathode to the electric motor of the blowout preventer;
   an isolator preventing electrical current from flowing from said thermal battery into the primary battery;
   a lower power internal battery;
   a thermal batter actuator connecting said low power internal batter to said electrically operated primer for actuating said thermal battery upon imminent blowout from the wellhead and upon failure of said primary battery to power the electric motor for preventing a blowout from the wellhead;
   a mechanical actuator comprising a spring-loaded firing pin aligned with a primer;
   a blocking member maintaining said spring-loaded firing pin in a cocked position; and
   said spring-loaded firing pin impacting said primer upon removal of said blocking member for mechanically igniting a squib and a heater to activate said electrolyte to provide electrical power to the blowout preventer.

2. In a blowout preventer as set forth in claim 1, wherein said mechanical actuator comprises a pull ring actuating said mechanical actuator upon movement of said pull ring; and
   said pull ring adapted to be moved by a remote operated vehicle (ROV) controlled from a remote location.

3. In a blowout preventer as set forth in claim 1, wherein said mechanical actuator comprises a pressure sensor in the form of a blowout plug; and
   a lanyard interconnecting said blowout plug and said mechanical actuator for actuating said mechanical actuator upon a pressure above a predetermined value within the wellhead expelling the blowout plug from the wellhead.

4. In a blowout preventer having a tubular bore protector interconnected between a wellhead and a riser in a petroleum well, the blowout preventer having a shearing ram powered by a hydraulic system including a hydraulic pump driven by an electric motor connected to a primary battery, and a control interconnected between the electric motor and the primary battery for actuating the electric motor to move the shearing ram to deform and seal the tubular bore protector to prevent a blowout from the wellhead, the improvement comprising:
   a thermal battery having:
      an anode and a cathode with a seperator containing an electrolyte disposed between the anode and the cathode;
      an internal heat layer located in proximity to said separator containing said electrolyte;
      an electrically operated primer for activating said thermal battery;
   an anode and a cathode connector directly connecting said anode and cathode to the electric motor of the blowout preventer;
   an isolator preventing electrical current from flowing from said thermal batter into the primary battery;
   a low power internal battery;
   a thermal battery actuator connecting said low power internal battery to aid electrically operated primer for actuating said thermal battery upon imminent blowout from the wellhead and upon failure of said primary battery to power the electric motor for preventing a blowout from the wellhead;
   a sensor for providing a sensor output upon sensing the pressure above a predetermined value in the petroleum apparatus;
   an actuator connected to said sensor for electrically igniting a squib and a heater to activate said electrolyte to provide electrical power to the blowout preventer; and,
   a mechanical device comprising a spring loaded firing pin and a primer for mechanically igniting said squib and said heater to activate said electrolyte to provide electrical power to the blowout preventer upon releasing said firing pin.

5. In a blowout preventer as set forth in claim 4, wherein said mechanical actuator comprises a pull ring for actuating said mechanical actuator upon movement of said pull ring; and
   said pull ring adapted to be moved by a remote operated vehicle (ROV) controlled from a remote location.

6. In a blowout preventer a set forth in claim 4, wherein said mechanical actuator comprises a spring-loaded firing pin located adjacent to a primer;
   a blocking member for maintaining said spring-loaded firing pin in a cocked position; and
   a mechanical removal of said blocking member enabling said spring loaded firing pin to impact said primer to actuate the thermal battery.

7. In a blowout preventer as set forth in claim 4, wherein said mechanical actuator comprises a pressure sensor in the form and a blowout plug; and
   a lanyard interconnecting said blowout plug and said mechanical actuator for actuating said mechanical actuator upon an pressure above a predetermined value within the wellhead expelling the blowout plug from the wellhead.

* * * * *